United States Patent [19]

Stogner

[11] Patent Number: 5,507,219
[45] Date of Patent: Apr. 16, 1996

[54] FAIL-SAFE LINKAGE FOR A RECIPROCATING PUMP

[76] Inventor: Huey Stogner, P.O. Box 803, Houston, Tex. 77001

[21] Appl. No.: 193,261

[22] Filed: Feb. 8, 1994

[51] Int. Cl.⁶ .................................................... F01B 29/00
[52] U.S. Cl. .................................. 92/128; 92/139; 74/44; 417/319; 417/360; 403/2
[58] Field of Search ................................ 60/403; 92/128, 92/134, 165 R, 261; 384/11; 403/2; 74/44; 417/319, 360

[56] References Cited

U.S. PATENT DOCUMENTS

| 25,786 | 6/1865 | Chancellor et al. . | |
|---|---|---|---|
| 1,037,840 | 9/1912 | Wintzer . | |
| 1,557,222 | 10/1925 | Warner . | |
| 2,550,369 | 4/1951 | Moreillon | 92/139 |
| 2,775,204 | 12/1956 | Batten et al. . | |
| 3,276,390 | 10/1966 | Bloudoff et al. . | |
| 3,922,104 | 11/1975 | McCullough | 403/2 |
| 4,566,370 | 1/1986 | Hanafi | 92/59 |
| 4,762,051 | 8/1988 | Besic et al. | 74/44 |
| 5,127,807 | 7/1992 | Eslinger | 417/360 |

*Primary Examiner*—F. Daniel Lopez
*Attorney, Agent, or Firm*—Sroufe, Payne & Lundeen

[57] ABSTRACT

Disclosed are a fail-safe linkage for a reciprocating pump and a method for repairing the pump following failure of the linkage. The pump linkage includes a break rod inserted between the crosshead and piston rod so that an inevitable failure of the linkage occurs predictably in the break rod. In such a manner, pump downtime can be reduced following failure since the break rod can be easily replaced without extensive disassembly of the pump.

14 Claims, 2 Drawing Sheets

FAIL-SAFE LINKAGE FOR A RECIPROCATING PUMP

FIELD OF THE INVENTION

The present invention relates to reciprocating pumps and more particularly, the present invention relates to an improved pump linkage including a break rod for a fail-safe operation.

BACKGROUND OF THE INVENTION

Reciprocating piston pumps such as triplex pumps are well known in the art. Such pumps commonly employ a linkage including a crankshaft attached at one end to a rotating drive wheel or gear and at the other end to a crosshead slideably engaged in a lateral guide for converting the rotary motion of a drive into reciprocal motion of the crosshead. The crosshead is then connected to a pump piston or plunger via appropriate smaller diameter connecting rods. As is well known, longitudinal alignment of the pump linkage is critical for extended operation of the pump since any misalignment imposes friction and flexure stresses particularly in the connecting rods.

Over time even in closely aligned pumps, the linkage will eventually fail. It is hypothesized that stresses due to the constant reciprocation against pressure cause gradual hardening and embrittlement of the rods until one of them fails by breaking in two. While a periodic downtime for replacement of the broken rod is expected, the broken rod can sometimes result in damage to other components of the pump assembly. In addition, replacement of a broken rod can become difficult if substantial disassembly of the pump is required. Further, if the broken rod is an integral part of another component of the linkage (such as the crosshead), it may also be necessary to replace an expensive pump component which is otherwise in good condition.

Thus, there is a need for a pump linkage adapted to fail predictably. The linkage upon failure should not damage other components and be easily repaired with minimum downtime.

U.S. Pat. No. 4,566,370 to Hanifi discloses a reciprocating piston pump driven by a rotating drive via a crankshaft including a crosshead, a transfer rod and a piston. The connection between the transfer rod and the piston is said to ensure a certain lateral and angular moveability so as to avoid any distortion or twisting forces which could otherwise result in misalignment of the piston, crosshead and transfer rod.

U.S. Pat. No. 1,037,840 to Wintzer discloses a reciprocating piston in a cylinder driven by a rotating driver via a crankshaft, crosshead and piston rod.

U.S. Pat. No. 3,276,390 to Bloudoff et al. discloses a reciprocating pump driven by a rotating driver. A plunger is connected to a plunger mandrel by a bolt having a reduced cross section. The mandrel has a flange which is attached to a flange of an intermediate rod by a clamp wherein the intermediate rod is threadedly engaged to a crosshead. It is stated that under excessive loads breakage will occur at the bolt. Further damage which can occur on continued stroking is said to be limited to parts which are relatively inexpensive and easily replaceable.

U.S. Pat. No. 1,557,222 to Warner discloses a reciprocal pump apparatus powered by a rotating drive wheel having an eccentrically attached crankshaft. The crankshaft is pivotably connected to a reciprocating crosshead which, in turn, is connected to a piston rod. The crosshead rides in a cross guide and a threaded end of the piston rod engages a threaded bore in the crosshead.

SUMMARY OF THE INVENTION

By installation of a break rod in a pump linkage, a reciprocal pump of the present invention can be adapted for fail safe operation. By fail-safe, it is meant that the failure will occur after an extended period of operation at a predetermined location in the linkage. Upon failure, the break rod can be easily replaced to reduce pump turn-around time.

As one embodiment, the present invention provides a reciprocating pump linkage for mechanically connecting a piston rod of a pump unit to a crosshead member of a drive unit. The linkage comprises a crosshead extension rod having a proximal end removably secured the crosshead member and a distal end comprising a coaxial bore. A break rod having a proximal end received in the bore of the crosshead extension rod and a distal end for coupling the piston rod is provided for defining a fail-safe break point in the linkage. The proximal end of the break rod preferably has a smaller cross-sectional area than the distal end of the crosshead extension rod. Alternatively, the proximal end of the break rod comprises a weaker material of construction than the distal end of the crosshead extension rod.

In a preferred embodiment, adjacent ends of the break rod and crosshead extension rod are threadably connected. The distal end of the break rod is releasably connected to the piston rod. Adjacent ends of the break rod and piston rod comprise matching flanges connected by a clamp. The proximal end of the crosshead extension rod includes a flange bolted to the crosshead at an axial distal surface. The proximal end of the break rod has a threaded portion having a greater number of threads than the bore of the crosshead extension rod. The threaded portion of the break rod has a tapped coaxial bore extending the threaded length thereof for decoupling a severed threaded portion from the bore in an event of a failure of the break rod. The distal end of the crosshead extension rod has a diameter portion adapted for engagement with a box wrench.

In another embodiment, the present invention provides a method for repairing a reciprocal pump incorporating the inventive fail-safe break rod following an ordinary failure thereof. As a first step, a severed break rod threaded portion is decoupled from the crosshead extension rod bore. An associated severed break rod flanged portion is unclamped from connection with the piston rod. A new break rod is installed between the crosshead extension rod and the piston rod. The repaired linkage is suitably axially aligned to inhibit stress therein during pump operation. The break rod installing step includes threadably coupling the break rod threaded portion to the crosshead extension rod bore, and clamping the break rod flange to the piston rod flange. After failure, the decoupling step includes inserting an appropriate tool into the tapped coaxial bore in the severed break rod threaded portion.

DETAILED DESCRIPTION OF THE INVENTION

A reciprocal pump is adapted for fail-safe operation by installation of a break rod in the pump linkage. Upon failure, the broken rod can be quickly replaced for reduced pump downtime and maintenance costs.

Figure 1:
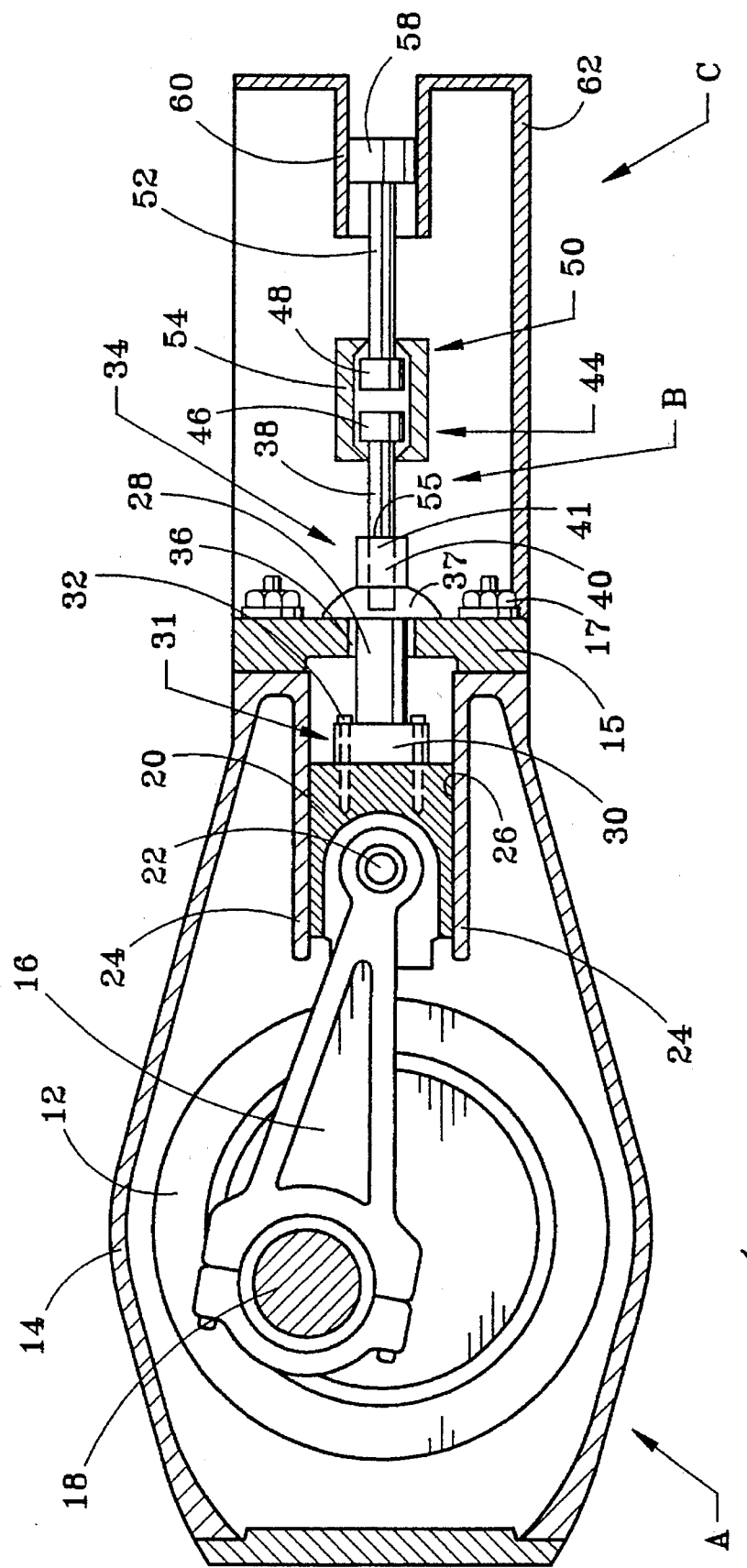
FIG. 1 is a schematic representation of a cross-sectional elevational view of a reciprocating pump incorporating the fail-safe linkage of the present invention.
Figure 2:
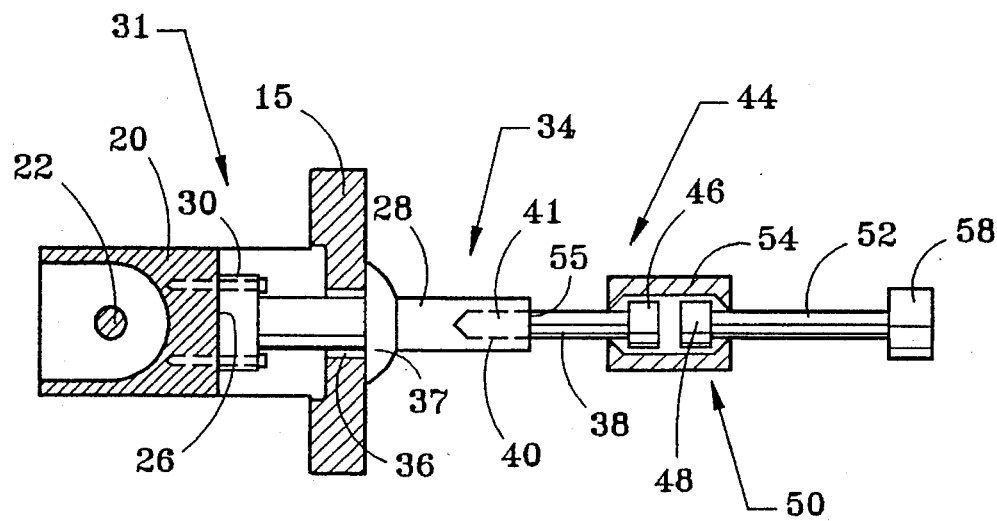
FIG. 2 is an schematic, partial cross-sectional view of the present invention of FIG. 1 showing the linkage crosshead extension rod and an associated break rod.
Figure 3:
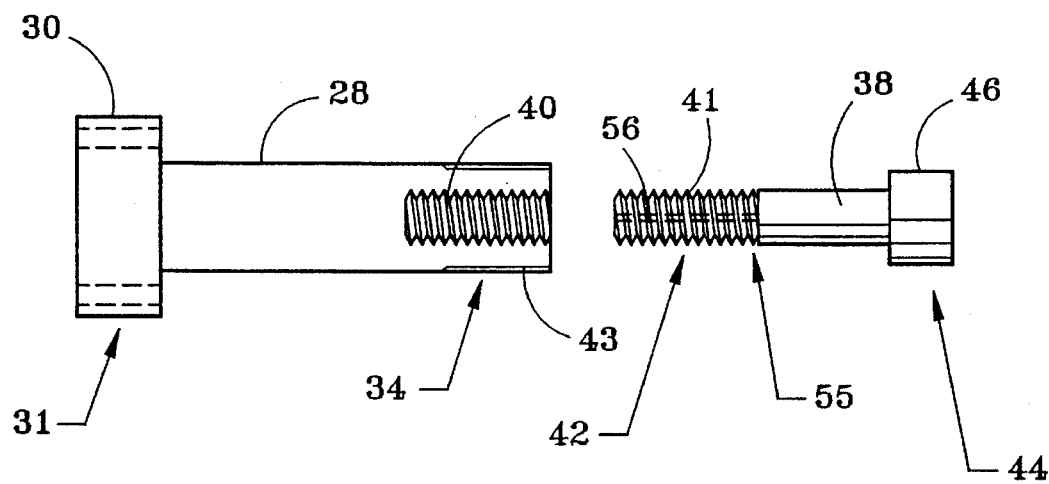
FIG. 3 is a schematic top view detail of the crosshead extension rod and break rod of FIG. 2 in an unconnected state.

Referring to FIGS. 1–3, a pump assembly shown generally as 10 comprises a drive unit A mechanically connected by a linkage B to a pump unit C. As is well known in the art, the drive A comprises a drive wheel 12 turned by rotary drive means such as an electric motor and reduction gears (not shown) enclosed in a housing 14. The housing 14 typically includes a flanged head 15 bolted thereto by bolts 17.

To convert rotating action of the drive A into the reciprocating action of the pump C, the linkage B includes a crankshaft 16 connected at a one end to the drive wheel 12 by a first pin 18. At the other end, the crankshaft 16 is pivotably connected to a crosshead 20 by a second pin 22. The crosshead 20 slides reciprocally within parallel guides 24 integral with the housing 14.

The crosshead 20 includes an outer distal surface 26 suitable for the connection of a crosshead extension rod 28. While any connecting means can be employed, the crosshead extension rod 28 is preferably connected to the crosshead 20 by flange 30 formed at a proximal end 31 thereof. The flange 30 is bolted at the crosshead surface 26 by bolts 32. The crosshead extension rod 28 includes a distal end 34 received in an opening 36 in the drive housing 14 and extending into the pump unit B. The opening 36 is preferably sealed by a bushing seal 37 to inhibit flow of lubrication fluid from the drive housing 14 to the pump unit B.

The distal end 34 of the crosshead extension rod 28 is adapted for connection to a break rod 38. Thus, the extension rod 28 has an internal threaded bore 40 for connection to a complementary external threaded portion 41 at a proximal end 42 of the break rod 38. The threaded portion 41 preferably has a greater number of threads than the bore 40. The crosshead extension rod distal end 34 is preferably provided with a diameter section 43 having a square or hexagonal transverse cross-section adapted for engagement with a box wrench, for example, to facilitate threaded connection of the break rod 38.

The distal end 44 of the break rod 38 includes a flange 46 for connection to a complementary flange 48 at a proximal end 50 of piston rod 52. A clamp 54 preferably secures the flanges 48, 52 to ensure the maintenance of proper alignment in the linkage B during the operation of the pump 10. Preferably, a gap between flanges 48, 52 when connected is on the order of about 0.001 inches or less.

In accordance with the present invention, the break rod 38 is mechanically weaker than the other members of the linkage B preferably due to a smaller diameter. A juncture 55 at which the break rod 38 is connected to the crosshead extension rod 28 thus provides a point of predictable mechanical failure in the break rod 38. The break rod can also be made from a mechanically weaker material than other components of the linkage B. In a preferred embodiment, the break rod threaded portion 41 includes a tapped coaxial bore 56 extending the length thereof to facilitate removal of the threaded portion 41 from the threaded bore 40 of the crosshead extension rod 28 following failure of the break rod 38.

As is conventional in the art, the pump unit C comprises a piston 58 connected at a distal end of the piston rod 52. The piston 58 is disposed in a cylinder 60 coaxial with the linkage B for slidable engagement therein. The cylinder 60 is generally mounted in a pump housing 62.

In the practice of the present invention following failure of the break rod 38, the severed portions can be removed and a new rod can be installed without disassembly of the crosshead 20 and the cylinder 60. Specifically, following a fracture from the distal end 44 the threaded portion 41 is extracted from the bore 40 in the crosshead extension rod 28 by a conventional thread extraction tool inserted into the tapped bore 56. The distal end 44 including the flange 46 separated from the threaded portion 41 by the failure of the break rod 38 is unclamped from the piston rod 52. A new break rod is installed by initially threadably coupling the break rod threaded portion 41 to the extension rod bore 40 and clamping the new break rod flange 46 to the piston rod flange 48 so that the linkage B maintains the crosshead 20 and the piston 58 in close alignment along the pump axis.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

I claim:

1. A reciprocating pump linkage for mechanically connecting a piston rod of a pump unit to a crosshead member of a drive unit, comprising:

(a) a crosshead extension rod having a proximal end removably secured to the crosshead member and a distal end comprising a coaxial bore; and (b) a break rod having a proximal end received in the bore of the crosshead extension rod and a distal end for coupling the piston rod, wherein the break rod defines a fail-safe break point in the linkage.

2. The linkage of claim 1, wherein the proximal end of the break rod has a smaller cross-sectional area than the distal end of the crosshead extension rod.

3. The linkage of claim 1, wherein the proximal end of the break rod comprises a weaker material of construction than the distal end of the crosshead extension rod.

4. The linkage of claim 2, wherein adjacent ends of the break rod and crosshead extension rod are threadably connected.

5. The linkage of claim 4, wherein the distal end of the break rod is releasably connected to the piston rod.

6. The linkage of claim 5, wherein adjacent ends of the break rod and piston rod comprise matching flanges connected by a clamp.

7. The linkage of claim 6, wherein the proximal end of the crosshead extension rod includes a flange bolted to the crosshead at an axial distal surface.

8. The linkage of claim 7, wherein the proximal end of the break rod has a threaded portion having a greater number of threads than the bore of the crosshead extension rod.

9. The linkage of claim 8, wherein the threaded portion of the break rod has a tapped coaxial bore extending the threaded length thereof for decoupling a severed break rod threaded portion from the bore in event of a failure of the break rod.

10. The linkage of claim 9, wherein the distal end of the crosshead extension rod has a diameter portion adapted for engagement with a box wrench.

11. A method for repairing a reciprocal pump, comprising the steps of:

decoupling the severed break rod threaded portion from the crosshead extension rod bore following failure of the break rod of the linkage of claim 9;

unclamping an associated severed break rod flanged portion from connection with the piston rod; and installing a new break rod between the crosshead extension rod and the piston rod to form a new linkage.

12. The method of claim 11, comprising:

aligning the new linkage to inhibit stress therein during pump operation.

13. The method of claim 12, wherein the break rod installing step includes coupling the break rod threaded portion to the bore of the crosshead extension rod, and clamping the flange of the break rod to the flange of the piston rod.

14. The method of claim 13, wherein the decoupling step includes inserting an appropriate thread extraction tool into the tapped coaxial bore in the severed rod threaded portion.

* * * * *